United States Patent [19]

Alessio et al.

[11] Patent Number: 4,775,964

[45] Date of Patent: Oct. 4, 1988

[54] ELECTROLUMINESCENT DIAL FOR AN ANALOG WATCH AND PROCESS FOR MAKING IT

[75] Inventors: Ralph D. Alessio, Prospect, Conn.; Fredrik Olsen, Oslo, Norway

[73] Assignee: Timex Corporation, Middlebury, Conn.

[21] Appl. No.: 142,596

[22] Filed: Jan. 11, 1988

[51] Int. Cl.[4] ..................... G04B 19/30; G04B 19/32; G01D 11/28

[52] U.S. Cl. ..................................... 368/67; 368/226; 368/227; 368/228; 362/23

[58] Field of Search .................. 368/67, 223, 226–228, 368/233, 234, 239; 362/23, 26, 27, 29, 34, 62, 84

[56] References Cited

U.S. PATENT DOCUMENTS

| | | | |
|---|---|---|---|
| 3,194,003 | 7/1965 | Polin | 58/50 |
| 3,749,977 | 7/1973 | Sliker | 315/276 |
| 4,181,925 | 1/1980 | Burrows et al. | 362/23 |
| 4,208,869 | 6/1980 | Hanaoka | 368/67 |
| 4,297,681 | 10/1981 | Dircksen | 362/23 |
| 4,488,818 | 12/1984 | Saurer et al. | 368/71 |
| 4,500,173 | 2/1985 | Leibowitz | 350/345 |
| 4,532,395 | 8/1985 | Zukowski | 200/314 |
| 4,559,582 | 12/1985 | Scardilli et al. | 362/23 |
| 4,667,273 | 5/1987 | Queudray | 362/34 |

FOREIGN PATENT DOCUMENTS

| | | | |
|---|---|---|---|
| 54-137374 | 10/1979 | Japan | 368/227 |
| 55-126888 | 10/1980 | Japan | 368/226 |
| 57-116281 | 7/1982 | Japan | 368/226 |

*Primary Examiner*—Vit W. Miska
*Attorney, Agent, or Firm*—William C. Crutcher

[57] ABSTRACT

An electroluminescent device adapted to serve as the dial of a conventional analog timepiece, with a central aperture for the stem carrying the timepiece hand and inscribed on the upper surface thereof with conventional time-indicating indicia, so that it can be read as a normal watch dial.

9 Claims, 1 Drawing Sheet

ELECTROLUMINESCENT DIAL FOR AN ANALOG WATCH AND PROCESS FOR MAKING IT

BACKGROUND OF THE INVENTION

This invention relates generally to improvements to "analog" wristwatches which are illuminated for telling the time in the dark. More particularly, the invention relates to an improved illuminated dial for an analog watch.

Electroluminescent devices were allegedly proposed by G. Destrau, London, Edinburgh, and Dublin Philosophical Magazine, Series 7, Volume 38, No. 285, Pgs. 700–737, October, 1947. There are a number of U.S. Pat. Nos. such as 2,988,661—Goodman and 2,928,974—Mash and 3,749,977—Sliker which describe the basic electroluminescent lamp. Such a lamp may comprise a sheet of glass or plastic with a conductive layer which acts as a first electrode, an electroluminescent layer comprising phosphor in a binder such as epoxy resin and a conductive sheet on the other side of the electroluminescent layer which serves as a second electrode. The resulting electroluminescent device is basically a capacitive circuit element, and when an alternating or pulsed voltage is applied across the two electrodes, the phosphor will illuminate or emit light in various colors depending upon the phosphor employed.

Electroluminescent devices have been proposed for two purposes in timepieces:

The first proposal is to use the electroluminescent device as a lamp to serve as a backlight for a transparent electro-optical display such as a liquid crystal display. The electroluminescent device does not provide any assistance to timekeeping other then as a source of illumination for the electro-optic display which indicates the time. Exemplary patents showing this use are seen in U.S. Pat. Nos. 4,208,869—Hanaoka; 4,238,793—Hochstrate; and 4,500,173—Leibowitz, et al.

The second proposal for utilizing electroluminescent devices in a timepiece is entirely different and suggests utilizing a group of radial segments or circumferentially spaced segments which are separately and selectively energizable to indicate the time. Exemplary patents utilizing selectively energized electroluminescent segments are U.S. Pat. Nos. 3,194,003—Polin; 3,258,906—Demby; 3,276,200—Freeman; and French Patent No. 1316428.

It is also known that a liquid crystal display with a central hole in it may serve in a dual capacity as the dial for a wristwatch with conventional hands as shown, for example, in U.S. Pat. No. 4,488,818. Also, it is known to utilize electroluminescent devices as backlighting for numerals printed directly on the electroluminescent device itself as shown in U.S. Pat. No. 4,532,395—Zukowski for flexible illuminated push buttons.

One of the difficulties in the past with utilizing electroluminescent devices in timepieces was the requirement of high voltage needed to produce sufficient light from the device, whereas modern electronic timepieces operate on low voltage using a single energy cell of only one and a half volts. This requires special circuits to boost the voltage for upgrading the supply voltage to the electroluminescent device and results in additional power consumption. However, it is known that losses can be reduced and still obtain acceptable brightness in relatively large panels of 0.1 square meter by connecting the capacitive panel with an inductor in a resonant circuit with the frequency of an AC source being adjusted to the resonant frequency of the circuit, according to U.S. Pat. No. 3,749,977—Sliker, issued July 31, 1973. In the Sliker patent, the substrate and the electroluminescent film are both disposed between the electrodes and selected to have equivalent electrical loss characteristics not to exceed a specified factor.

Accordingly, one object of the present invention is to provide an improved electroluminescent device for a conventional analog timepiece which enables reading the time at night.

Another object of the invention is to provide an improved electroluminescent device for use in a timepiece which operates at lower voltage.

Still another object of the invention is to provide an improved dial for reading an analog timepiece at night and a process for making it.

SUMMARY OF THE INVENTION

Briefly stated, the invention is practiced by providing an electroluminescent device adapted to serve as the dial of a conventional analog timepiece, providing it with a central aperture for the stem carrying the timepiece hand and inscribing the upper surface thereof with conventional time-indicating indicia, so that it can be read as a normal watch dial.

The electroluminescent device is further adapted to provide an illuminated dial for the timepiece by providing an actuating circuit within the timepiece, with means to connect the circuit to the electroluminescent device. The electroluminescent device is preferably constructed of a transparent insulating substrate with timekeeping indicia on one surface and a first electrically conductive layer on the other surface, a second layer adhered to the electrically conductive layer comprising an electroluminescent mixture of phosphor particles dispersed within a polymeric resin binder, a third thin layer of insulating moisture resistant barrier material adhered to the second layer and a fourth layer of electrically conductive material of reflective metal adhered to the third layer. The phosphor size range is selected with respect to a minimum spacing between the conductive layers to reduce the voltage required to actuate the electroluminescent dial. Preferably, the polymeric resin binder in the second layer is an epoxy resin.

DRAWING

The invention will be better understood by reference to the following description taken into connection with the appended drawings, in which.

DESCRIPTION OF THE PERFERRED EMBODIMENT

Figure 1:
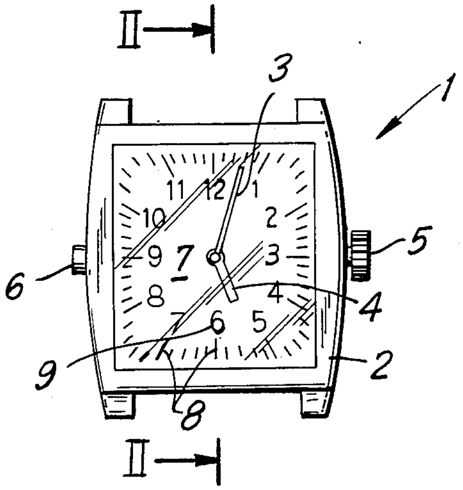
FIG. 1 is a plan view of an analog watch.

FIG. 1 illustrates a timepiece comprising a wristwatch 1 with a conventional case 2 and with a minute hand 3 and a hour hand 4 mounted on rotatable stems and driven by a conventional movement, the details of which are not material to the present invention. A crown 5 is employed to set the position of the time indicating hands 3, 4, while a push button actuator 6 is connected to operate switch contacts (not shown) inside the case of the watch. Below the hands are a dial 7 having time indicating indicia thereon, such as the hour and minute markers 8 and numerals 9.

Figure 2:
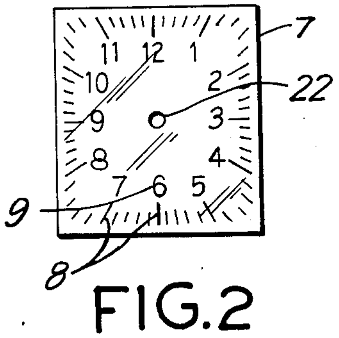
FIG. 2 is a plan view of the dial removed from the watch
Figure 3:
FIG. 3 is an end view of the dial removed from the watch.

FIGS. 2 and 3 are plan view and end view respectively of the dial 7 removed from the watch to illustrate that it is a thin flat member cut in the shape of a watch dial and having a central hole 22 therein for accommodating the watch stem.

Figure 4:
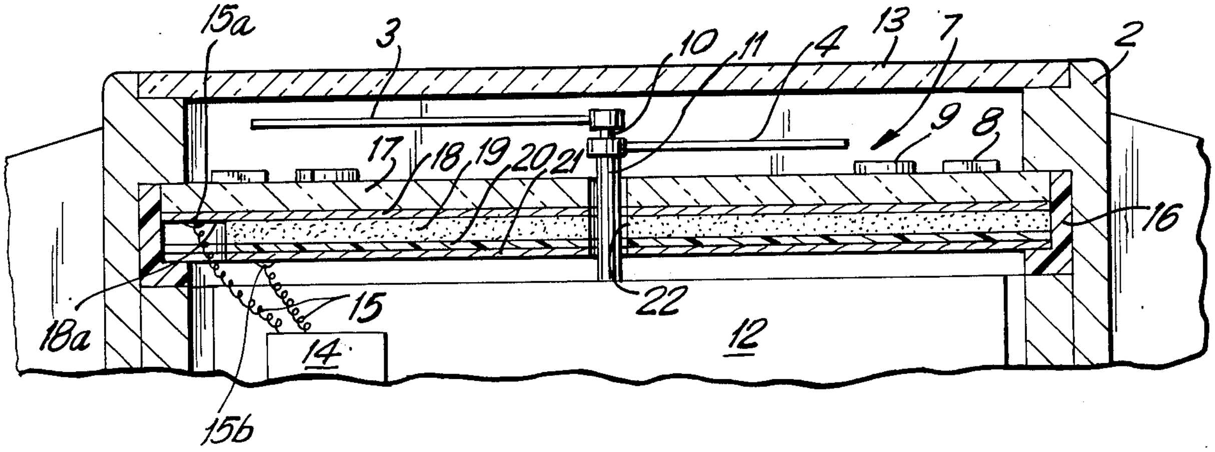
FIG. 4 is a cross-sectional schematic view taken along lines II—II of FIG. 1.

Referring to the cross-section of FIG. 4, the hands 3, 4, are mounted upon coaxial rotating stems 10, 11, respectively which are centrally located and connected to be rotated or periodically "stepped" by movement 12. Movement 12, may for example, comprise a stepping motor actuated by an integrated circuit with a quartz timebase and driving a gear train ultimately connected to stems 10, 11, in a manner well known in the art. The case 2 or bezel includes a transparent crystal 13 through which to observe the hands 3, 4, and their position in relation to the indicia 8, 9, on dial 7.

Also disposed inside case 2 is an electroluminescent drive circuit 14 which supplies drive pulses via output leads 15 when actuated by external push button actuator 6. A suitable integrated circuit for this purpose is shown in U.S. Pat. No. 4,527,096—Kindlmann entitled "Drive Circuit for Capacitive Electroluminescent Panels" and assigned to Timex Corporation, said patent being incorporated herein by reference. Another suitable circuit is disclosed in pending application Ser. No. 924,730 filed Oct. 30, 1986, and assigned to the present assignee. Although the subject circuits are described as useful for activating electroluminescent lamps to be used by backlights for timepiece LCD displays, they are also suitable for activating the electroluminescent dial of the present invention.

Dial 7 is mounted in case 2 by means of an insulating gasket 16 which supports the dial 7 about its periphery. Gasket 16 guards against cracking or breakage of dial 7 as well as electrically insulating it from case 2.

Dial 7, which is not drawn to scale in FIG. 4, but greatly exaggerated in thickness for purposes of clarity, comprises a transparent substrate 17, a first layer 18 of electrically conductive material, a second layer 19 of electroluminescent material, a third thin layer 20 of insulating moisture resistant barrier material and a fourth layer 21 of electrically conductive material. Substrate 17 and layers 18–21, comprise a laminated assembly which is actually very thin, not exceeding around 18 mils ($460\times10^{-6}$m) if the substrate is glass or around 10 mils ($254\times10^{-6}$m) if the substrate is plastic film. A small portion of layers 19, 20, and 21 are removed by scraping to expose conductive layer 18 as shown at 18*a*. Alternatively, the area 18*a* may be masked off during application of layers 19, 20, 21. This exposed layer 18*a* allows making an electrical connection 15*a* to the second conductive layer 18. A similar electrical connection 15*b* is made to the fourth conductive layer 21. Leads 15 are attached to the electrical connections 15*a*, 15*b* which may be simply provided by a conductive adhesive such as silver epoxy. Lastly, the laminated assembly is provided with a central hole 22 for accommodating the rotatable stems 10, 11.

The preferred characteristics of elements 17–21 making up the electroluminescent laminated assembly are as follows: Substrate 17 is a transparent substrate which may be either rigid glass or flexible plastic film such as MYLAR (registered trademark of du Pont de Nemours & Co.) Since the substrate 17 is not disposed between the electrodes, any convenient thickness which is suitable for a watch dial may be used. First layer 18 is a thin electrically conductive film, usually indium tin oxide, adhered to the substrate 17. Either glass or Mylar with such a conductive layer already applied is a commercially available product.

The second layer 19 is an electroluminescent mixture of luminescing phosphor particles uniformly dispersed within a polymeric binder. The phosphor materials are carefully screened to a size of between 10 to 25 microns ($15\times10^{-6}$m to $25\times10^{-6}$m). The polymeric binder is selected from a class of epoxy resins which exhibit low electrical losses and moisture resistant qualities when cured. It has been found that a superior binder for this purpose is an epoxy resin of the bisphenol-A class, having a moderate dielectric constant of around 5. The moisture resistance especially is a critical factor in the present invention, since the laminated assembly is not encased and the edges of the layer 19 are exposed both at the periphery of the dial and inside hole 22. In order to reduce the voltage required to drive the electroluminescent device to produce an acceptable light output, the thickness of the electroluminescent layer is preferably around 1.5 mils ($38\times10^{-6}$m) thickness and should not exceed 2.5 mils ($62\times10^{-6}$m) thickness. The layer 19 can be applied by knife blading or by spin coating.

The third layer 20 is an insulating moisture resistant barrier material which serves to physically and electrically isolate or block the next applied layer from the electroluminescent layer in order to prevent chemical interaction and to fill any voids and interstices in the polymeric resin binder. Such voids and interstices would permit the entry of moisture which degradates the phosphor cyrstals and causes shorting between electrodes or conductive layers. Third layer 20 may also have a moderate dielectric constant of around 3 and 4. It may be sprayed on or applied by conventional vacuum vapor deposition techniques.

Lastly, the fourth layer 21 is an electrically conductive metallic layer adhered to layer 20. It may be heat-curable silver epoxy applied with a brush or knife blade, or it may be aluminum applied in particles in an evaporative carrier, or it may be applied by vacuum vapor deposition, for example. It is preferable to employ a clear or transparent material for the insulating layer 20 and a shiny, bright or reflective substance such as silver or aluminum for layer 21, in order to reflect light upward through the transparent substrate as well as to provide a light background for the time indicating indicia on the dial when the electroluminescent material is not activated.

Hole 22 is formed either by sandblasting or laser drilling if the substrate is glass, or may be punched or conventionally drilled if the substrate is plastic film.

Timekeeping indicia 9 are printed on the opposite or nonconductive top surface of the substrate by transfer printing or silk-screening, using conventional techniques of the same type which are presently used to manufacture conventional watch dials.

EXAMPLE I

A glass substrate with conductive indium tin oxide coating, overall approximately 12 mils thick ($280\times10^{-6}$m) was cut into proper shape for a dial, ground and cleaned. A phosphor/binder mixture comprising of 2.5 parts of GTE Sylvania No. 727 phosphor, screened and graded to particle sizes between 10 to 25 microns, was mixed with one part, by volume, of a heat curable bisthenol-A epoxy binder, commercially obtainable as ABELBOND 681-14 from Abelstick Laboratories. The mixture was spin coated to a thickness of 1.5 mils ($38\times10^{-6}$m) and cured in a furnace. An insulating moisture resistant barrier layer of clear acrylic resin, commercially available under the name of KRYLON spray coating No. 1302 available from Borden, Inc. was sprayed and air dried. Next a conductive layer of silver epoxy E-KOTE No. 3068 conductive paint, available from Allied Chemical and Insulation Co. was added by knife-blading. After drying, a center hole was drilled by sandblasting and the electrical contact area was provided by scraping. A transfer press applied a watch dial pattern to the front surface of the glass substrate, thereby completing the operation, and providing an rigid electroluminescent watch dial of 18 mils ($460\times10^{-6}$m) thickness.

EXAMPLE II

A substrate comprising a commercially available Mylar film of about 7 mils ($180\times10^{-6}$m) thickness and coated on one side with electrically conductive indium tin oxide was coated with the same phosphor/binder mix as in Example I in a layer of 1.5 mils ($38\times10^{-6}$m) thickness. Next an insulating moisture resistant barrier layer of barium titanate was applied by vacuum deposition, and subsequently metallic aluminum was applied by vapor deposition to provide the conductive layer. The overall thickness of the laminated assembly was only 10 mils ($254\times10^{-6}$m). The dial numbers and markers were applied by silk-screening and subsequently dials were cut to shape and the center hole formed in a punch press operation.

The dial of Example I produced a rigid dial on a glass substrate which requires more protection within the watchcase and which is more susceptible to cracking or damaging of the applied layers during handling. The dial in Example II is flexible, less expensive, far easier to cut to shape and form the center hole, and more suitable for mass production of watch dials.

While there is disclosed herein, what is considered to be the preferred embodiment of the invention, other modifications will become apparent to those skilled in the art, and it is desired to secure in the appended claims, all such modifications as fall within the true spirit and scope of the invention.

We claim:

1. An electroluminescent dial for a wristwatch of the type having at least one rotatable stem carrying a time indicating hand, said electroluminescent dial comprising:

a single sheet of transparent insulating substrate formed in the shape of a watch dial and having timekeeping indicia printed on one surface thereof toward said hand and having a first layer comprising electrically conductive material adhered to the opposite surface thereof, a second layer comprising an electroluminescent mixture adhered to said first layer, said mixture comprising phosphor particles, uniformly dispersed within an epoxy resin binder, a third layer comprising a thin insulating moisture resistant barrier material adhered to said second layer, a fourth layer comprising electrically conductive material adhered to said third layer, said substrate and said first, second, third and fourth layers together comprising a single laminated assembly, means for making electrical connections to said first and fourth layers, and said electroluminescent dial further defining a center hole through said substrate and through said layers for accommodating said rotatable stem.

2. The electroluminescent dial according to claim 1 wherein:

said second layer comprises an electroluminescent mixture of phosphor particles having a size between 10–25 microns and dispersed in a epoxy binder, said second layer having a thickness on the order of 1.5 mils and not exceeding 2.5 mils.

3. The combination according to claim 2, wherein said substrate and said first layer comprise glass coated with indium tin oxide on one side thereof.

4. The combination according to claim 2, wherein said substrate and said first layer comprise Mylar coated with indium tin oxide on one side thereof.

5. The combination according to claim 2, wherein said third layer is vacuum deposited barium titanate.

6. The combination according to claim 2, wherein said third layer is sprayed on clear acrylic resin.

7. The combination according to claim 2, wherein said fourth layer is a mixture of silver particles in epoxy resin.

8. The combination according to claim 2, wherein said fourth layer is a thin film of vacuum deposited aluminum.

9. The combination according to claim 2, wherein said epoxy binder of said second layer is bisphenol-A.

* * * * *